United States Patent
Kurtz

(10) Patent No.: US 7,178,403 B2
(45) Date of Patent: Feb. 20, 2007

(54) TRANSDUCER RESPONSIVE TO PRESSURE, VIBRATION/ACCELERATION AND TEMPERATURE AND METHODS OF FABRICATING THE SAME

(75) Inventor: Anthony D. Kurtz, Ridgewood, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 0 days.

(21) Appl. No.: 11/004,327

(22) Filed: Dec. 3, 2004

(65) Prior Publication Data
US 2006/0117860 A1   Jun. 8, 2006

(51) Int. Cl.
*G01L 9/00* (2006.01)

(52) U.S. Cl. .......................................... 73/754

(58) Field of Classification Search ................. 73/719, 73/720, 721, 725, 726, 727, 754; 257/414; 361/283.4
See application file for complete search history.

(56) References Cited

U.S. PATENT DOCUMENTS

| 3,930,823 | A | 1/1976 | Kurtz et al. |
| 4,522,072 | A * | 6/1985 | Sulouff et al. ................. 73/765 |
| 5,955,771 | A | 9/1999 | Kurtz et al. |
| 6,272,928 | B1 * | 8/2001 | Kurtz ........................... 73/721 |
| 6,293,154 | B1 | 9/2001 | Kurtz |
| 6,870,236 | B2 * | 3/2005 | Johnson ...................... 257/414 |

* cited by examiner

Primary Examiner—Jewel V. Thompson
(74) Attorney, Agent, or Firm—Plevy, Howard & Darcy, PC

(57) ABSTRACT

A pressure sensing device produces an output proportional to applied pressure irrespective of vibration/acceleration of the device, which device also provides an output proportional only to vibration/acceleration of the device irrespective of the pressure.

21 Claims, 6 Drawing Sheets

US 7,178,403 B2

TRANSDUCER RESPONSIVE TO PRESSURE, VIBRATION/ACCELERATION AND TEMPERATURE AND METHODS OF FABRICATING THE SAME

FIELD OF THE INVENTION

This invention relates to transducers in general, and more particularly to a transducer responsive to variations in pressure, vibration/acceleration and temperature.

BACKGROUND OF THE INVENTION

There are many instances where one would require a transducer to be used in applications to measure pressure in a high vibration environment to obtain a pressure measurement which is independent of vibration. One would also desire to obtain a vibration/acceleration measurement which is only a function of vibration/acceleration and which is independent of pressure. One may also require a temperature output which is a measurement of the temperature of the transducer. Such a transducer employs silicon piezoresistor sensors. The use of a transducer which is responsive to pressure, vibration and temperature may be employed in many applications. For example, such devices may be used in conjunction with aircraft engines, automobile engines and other devices where one would desire to measure pressure in a high vibration environment and to also obtain a pressure which is independent of vibration. It is also desirable to measure vibration/acceleration which is independent of pressure. Thus one can determine when both pressure and vibration reach proportions as to create a hazardous or dangerous condition which further can be considered in regard to temperature. As one can readily ascertain, temperature and pressure are utilized in many applications to make determinations of gas volume and other factors as well. Large vibrations on an aircraft or in an automobile can lead to dangerous conditions whereby parts may rupture, fracture, or become impaired.

It is therefore necessary to measure such parameters as indicated above. One, of course, can utilize separate transducers to accomplish this, however, additional expense and processing is involved.

It is therefore desirable to provide a transducer responsive to pressure, vibration and temperature and to provide outputs indicative of the same in a single device.

SUMMARY OF THE INVENTION

A pressure sensing device produces an output proportional to applied pressure irrespective of vibration/acceleration of the device, which device also provides an output proportional only to vibration/acceleration of the device irrespective of the pressure. A resistor is in series with a pressure sensing bridge to measure temperature of the device. The device includes a first deflecting diaphragm formed in a first wafer and including a first plurality of piezoresistors mounted thereon or otherwise formed therein. The first diaphragm is responsive to an applied pressure and also vibration of the device, such first diaphragm having an opened bridge. There is a second deflecting diaphragm formed in the first wafer and including a plurality of second piezoresistors mounted thereon or otherwise formed therein, the second diaphragm being responsive only to vibration of the device and not to pressure. A half bridge from the deflecting member sensitive to pressure and vibration is electrically coupled to a half bridge from the second diaphragm, which is only responsive to vibration. This will provide a common output such that this interconnected first full bridge will only be sensitive to pressure since the formed bridge will cancel out the vibration/acceleration effects. The second half bridge from the non pressure sensitive diaphragm is completed with fixed resistors such that an output signal is obtained which is only sensitive to vibration/acceleration. A fixed resistor with relatively zero temperature coefficient is placed in series with the input voltage of the first full bridge measuring pressure independent of vibration/acceleration. The voltage drop across this resistor varies with temperature signal proportional to temperature. If the two deflecting diaphragms are substantially the same size and the same thickness, and the piezoresistive characteristics of each half bridge are substantially the same, the output voltages from the same positive normal stress applied to each diaphragm will sum to zero in the first bridge. Because both diaphragms are subjected to the same stress by vibration or acceleration and only one of the two diaphragms is subjected to a positive pressure, a voltage output from the first full Wheatstone bridge produced by combining the half bridge from each of the diaphragms will result in a pressure output signal. Such a dual device can provide an output proportional to an applied pressure to be measured and independent of vibration and/or acceleration, and further provide an output proportional to vibration and/or acceleration and independent of applied pressure.

BRIEF DESCRIPTION OF THE DRAWINGS

Understanding of the present invention will be facilitated by consideration of the following detailed description of the preferred embodiments of the present invention taken in conjunction with the accompanying drawings, in which like numerals refer to like parts, and.

DETAILED DESCRIPTION OF THE INVENTION

Figure 1:
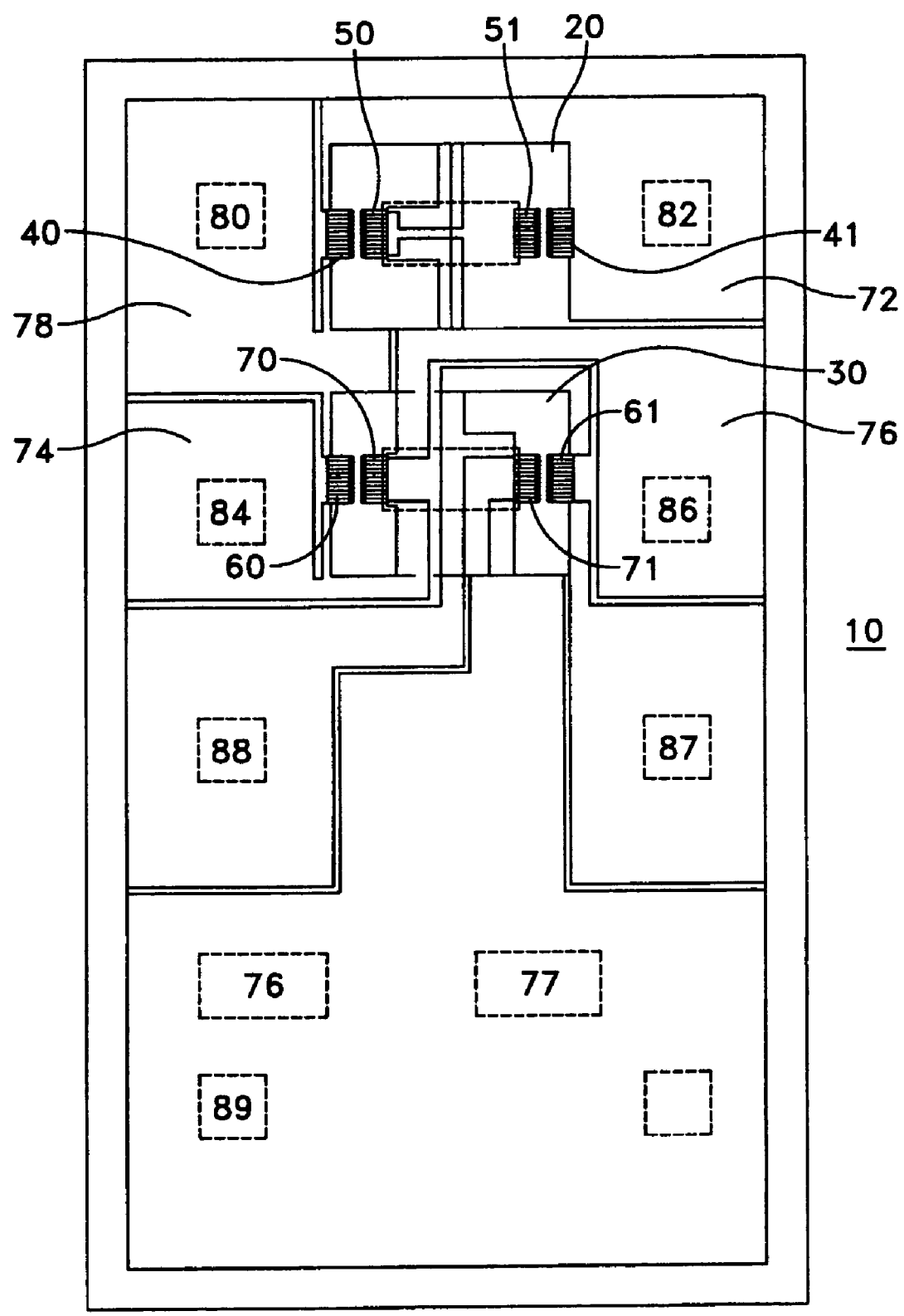
FIG. 1 is a top plan view of a transducer design according to this invention.
Figure 2:
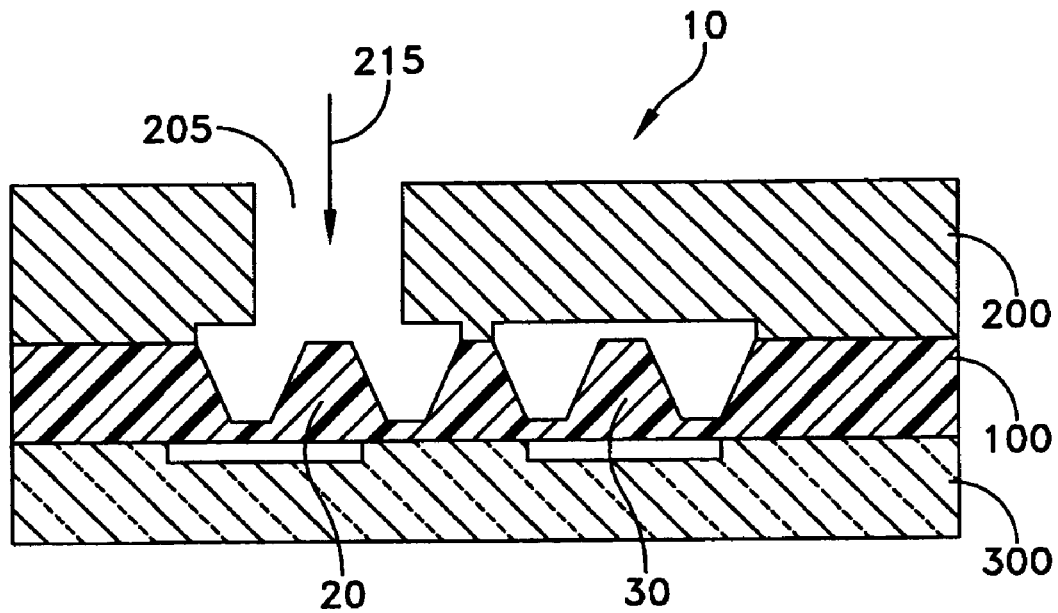
FIG. 2 is a cross sectional view of the transducer depicted in FIG. 1.
Figure 3:
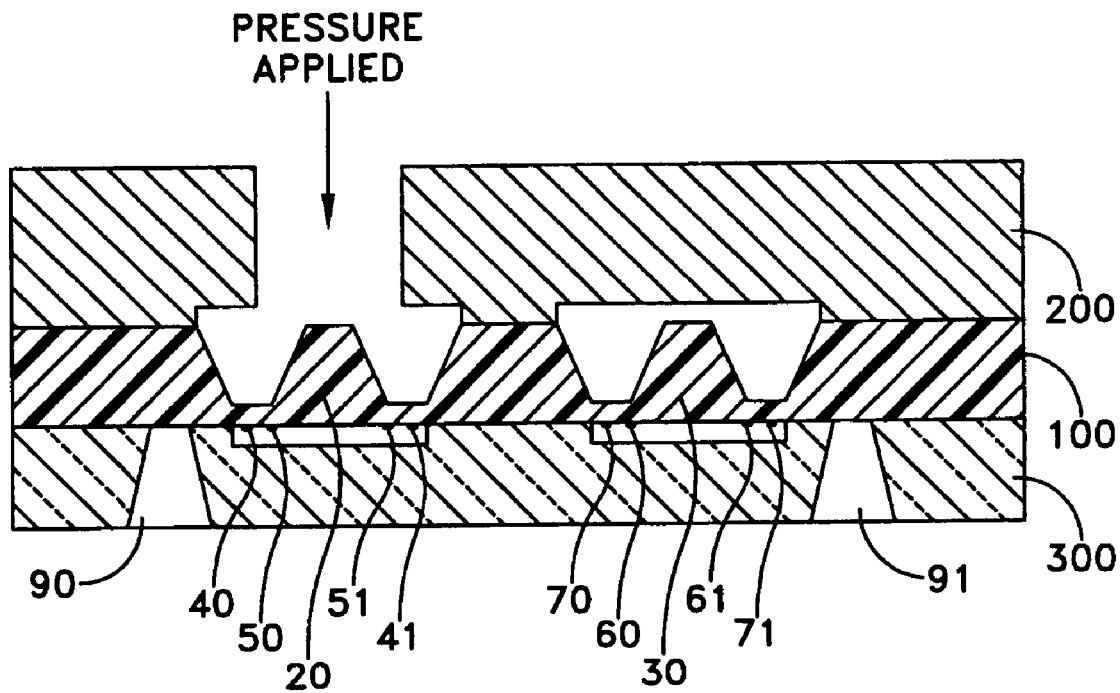
FIG. 3 is a cross sectional view in further detail of the transducer depicted in FIG. 1.
Figure 4:
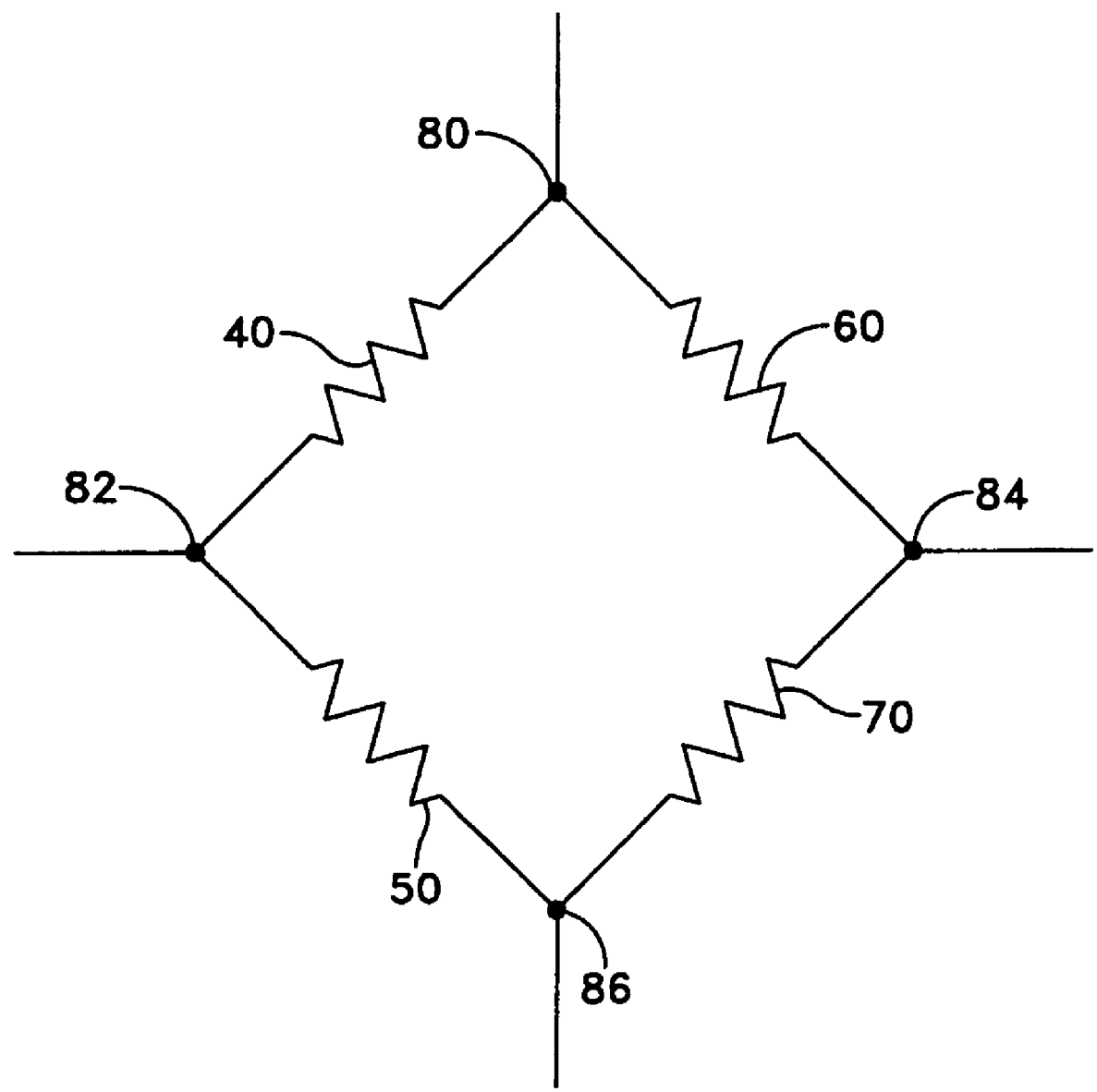
FIG. 4 is a schematic diaphragm of a pressure sensitive bridge having no vibration/acceleration sensitivity.

FIG. 1 through FIG. 4 have like reference numerals to identify like elements of the invention. FIG. 1 illustrates a partial top plan view of a transducer responsive to pressure, vibration and temperature according to the present invention. The transducer 10 is fabricated from silicon as will be explained utilizing conventional semiconductor processing techniques. Kulite Semiconductor Products Inc., the assignee herein, has numerous patents describing fabrication techniques utilizing silicon as well as other materials applicable to provide piezoresistive sensors arranged in various bridge configurations including the Wheatstone bridge to obtain outputs proportional to pressure. Referring to FIG. 1, the transducer 10 possesses two separate deflectable diaphragms 20 and 30. Each diaphragm is essentially a thinned area formed in the wafer and is capable of deflecting upon application of a suitable force or pressure. The fabrication of such diaphragms 20, 30 on a silicon wafer is well known. Each diaphragm 20 and 30 contains two sets of piezoresistors. For example, diaphragm 20 contains piezoresistors 40 and 50 as well as piezoresistors 41 and 51. Piezoresistors 41 and 51 are not used but can be provided for redundancy or for additional purposes. In a similar manner diaphragm 30 contains piezoresistors 60 and 70 as well as piezoresistors 61 and 71. As is known and as can be ascertained piezoresistors 40, 60 and 51 and 71 decrease with positive normal stress applied to the respective diaphragms 20 and 30. In a similar manner piezoresistors 50, 70 and 41 and 61 increase with positive normal stress applied to those diaphragms. The piezoresistors 40, 50 and 60 and 70 are electrically connected to form a full Wheatstone bridge such as illustrated in FIG. 4. As seen in FIG. 4 the resistor 40 associated with diaphragm 20 as well as resistor 50 associated with diaphragm 20 complete a bridge utilizing piezoresistors 60 and 70 associated with diaphragm 30 of FIG. 1. As one can ascertain in FIG. 4 the biasing and output terminals or pads 80, 82, 84 and 86 are depicted in FIG. 1 as areas 82, 80, 86 and 84. These areas are metalized areas which form large contact areas for the appropriate terminals of the Wheatstone bridge configuration. Thus as seen from FIG. 4 piezoresistors 40 and 50 associated with deflectable diaphragm 20 form one half of the Wheatstone bridge while resistors 60 and 70 associated with deflectable diaphragm 30 form the other half of the Wheatstone bridge. In the configuration depicted in FIG. 4 the bridge will provide an output at terminals 82 and 84 which is strictly responsive to pressure and is not responsive in any manner to vibration or acceleration as will be further explained. A conventional biasing voltage is applied to terminals 80 and 86 with either terminals serving as a point of reference potential and the other terminal receiving operating potential as is known. As one can ascertain the bridge depicted in FIG. 4 is a pressure sensitive bridge and provides an output signal proportional to pressure and independent of vibration/acceleration.

Referring to FIG. 2 there is shown a cross sectional view of the wafer of FIG. 1 depicting the theory of operation. As seen in FIG. 2, there is a cover member 200 which essentially operates to cover the deflecting diaphragm 30. The cover member 200 has an aperture 205 located therein which aperture is in direct contact with the deflecting diaphragm 20. Thus as one can see from FIG. 2 the diaphragm 20 has pressure or a force directly applied thereto as depicted by arrow 215, while the diaphragm 30 has no pressure or force applied thereto. Thus application of the pressure 215 as depicted in FIG. 2 will cause the diaphragm 20 to deflect but will not cause any deflection in diaphragm 30. Both diaphragms, 20 and 30, are formed in sufficient proximity to one another that the deflection caused in each of the diaphragms 20 and 30 by vibration and/or acceleration will be approximately the same amount. Thus the Wheatstone bridge as depicted in FIG. 4 is responsive to normal pressure 215 applied via aperture 205 but not to vibration or acceleration 10 because the Wheatstone bridge will cancel vibration or acceleration. Again as referring to FIG. 4 one can readily see that resistors 40 and 50 are subjected to pressure because of the application of the force 215 to the diaphragm 20. However, resistor 60 and 70 associated with diaphragm 30 which form the other arm of the bridge are not in any manner subjected to pressure. However the resistors of 60 and 70 are in fact subjected to the same exact vibration and acceleration as are resistors 40 and 50. Based on the operation of the Wheatstone bridge all effects due to vibration and acceleration are cancelled because of the bridge configuration while the bridge of FIG. 4 responds directly and only to pressure.

Referring to FIG. 3 there is shown a more detailed cross sectional view depicting the fabrication of the device. There is illustrated top cover 200 which may conventionally be formed of glass or silicon and is coupled to a silicon wafer 100 by means of a conventional seal. The silicon wafer 100 is treated by conventional photo-lithography techniques to produce a central boss area and a diaphragm section which is a thin section. The diaphragm section contains the sensing resistors such as resistors 40, 50, 60 and 70 depicted in FIG. 1. Each of the diaphragms 20 and 30 is associated with the sensing resistors. There are apertures such as 90 and 91 which communicate with the contact areas as for example 80 and 82, 88 and 87 of FIG. 1 to make contact to the various sensors depicted thereon so that one can obtain outputs from the bridge. Commonly assigned U.S. Pat. No. 5,955,771, entitled SENSORS FOR USE IN HIGH VIBRATIONAL APPLICATIONS AND METHODS FOR FABRICATING THE SAME issued Sep. 21, 1999 to A. C. Kurtz, et al., the entire disclosure of which is hereby incorporated by reference as if being sent forth in its entirety, teaches a hermetically sealed device which can be used with the present invention. It is understood that other structures can be used as well. The resulting structure is a thin sensor without external leads being suitable for high temperature mounting to an appropriate designed header. Such sensors are referred to as leadless sensors, and are suitable for high temperature operation. The entire device can be mounted on a preglazed kovar shim and then welded directly to the fan blade of a jet engine or for example the blade of a helicopter or to a suitable fan in an automobile or other device. In such devices as indicated above, one desires to have a transducer which is capable of measuring pressure, vibration and temperature. Such a device as depicted in FIG. 1 and as further described in FIG. 2 and so on will provide such operation.

Figure 5:
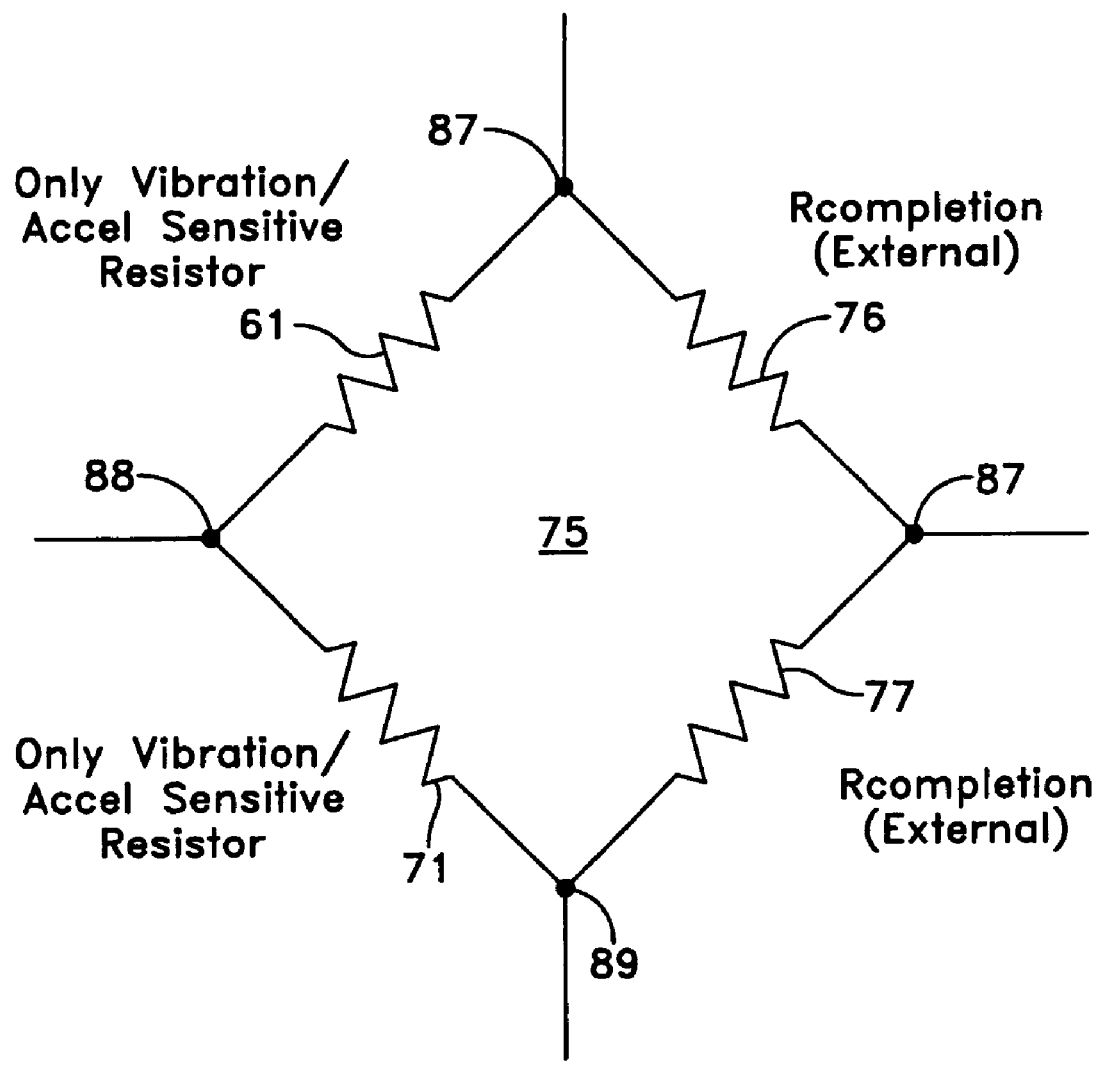
FIG. 5 is a schematic diaphragm of a bridge having vibration/acceleration sensitivity.

Referring to FIG. 5 there is shown another Wheatstone bridge configuration which essentially is fabricated from the piezoresistors depicted in FIG. 1. As seen in FIG. 5 piezoresistors 61 and 71 form one arm of the Wheatstone bridge 75. The other arm of the Wheatstone bridge is completed by resistors 76 and 77 which are external resistors connected to piezoresistors 61 and 71. The external resistors can be fabricated directly on the silicon wafer by well know techniques. As seen the bridge 75 is formed between terminals 87 and 89 depicted in FIG. 1 whereby resistors such as 76 and 77 are also fabricated on the wafer 10. Thus as one can ascertain the bridge will provide, at output terminals 87 and 88, a voltage which is proportional only to vibration/acceleration. The output voltage across terminals 87 and 88 is not affected in any manner by pressure as there is no pressure applied to the diaphragm 30 which resistors 61 and 71 are associated with. Resistors 76 and 77 are not subject to pressure or vibration due to the fact that they are mounted in a secure area of the chip referenced by terminal 89. This is the portion of the chip which would be permanently affixed to a rigid frame. In a similar manner while resistors 76 and 77 can be mounted on the wafer as shown in a non-deflecting area or a very rigid area, they can be further mounted external to the chip in a completely vibrationless area. The Wheatstone bridge depicted in FIG. 5 will provide an output strictly proportional to vibration/acceleration. As one can ascertain there are many conventional techniques available to fabricate such devices. Reference is also made to U.S. Pat. No. 3,930,823 entitled "High Temperature Transducers and Housing Including Fabrication Methods and Fusion Bonding Techniques For Use in Fabrication of Semiconductor Devices", the entire text of this patent incorporated herein by reference. Any conventional wafer processing technique which enables dielectrically isolated piezoresistor sensor elements 40, 50, 60, 70 and 41, 51, 61 and 71 to be formed on semiconductor material using dielectric films of silicon dioxide or the like could be used. The elements which constitute the piezoresistors such as 40 and 50 and so on are preferably formed of highly doped P+ silicon. It is understood that a number of such sensors can be made at the same time on a suitable substrate. The circuit nodes of all the Wheatstone half bridges include oversized P+ diffused silicon electrical contact areas or fingers which are mainly located in non active areas of the wafer 100. The term non active refers to the portion of the transducer which is firmly secured as to exhibit no deflection as compared to the active areas which are the diaphragm portions as 20 and 30 which are the portions that deflect or vibrate because of their thin profiles. The non active areas as indicated do not deflect or will not exhibit any substantial movement in regard to pressure application or in regard to vibration or acceleration. Hence as indicated the resistors such as 76 and 77 could be positioned on the wafer in these areas and would not be responsive to pressure or vibration. The term finger is used to indicate those areas which project from the piezoresistors to the metal contacts. The metal contacts within the contact area are preferably rectangular in shape although other shapes can be utilized as well.

Figure 6:
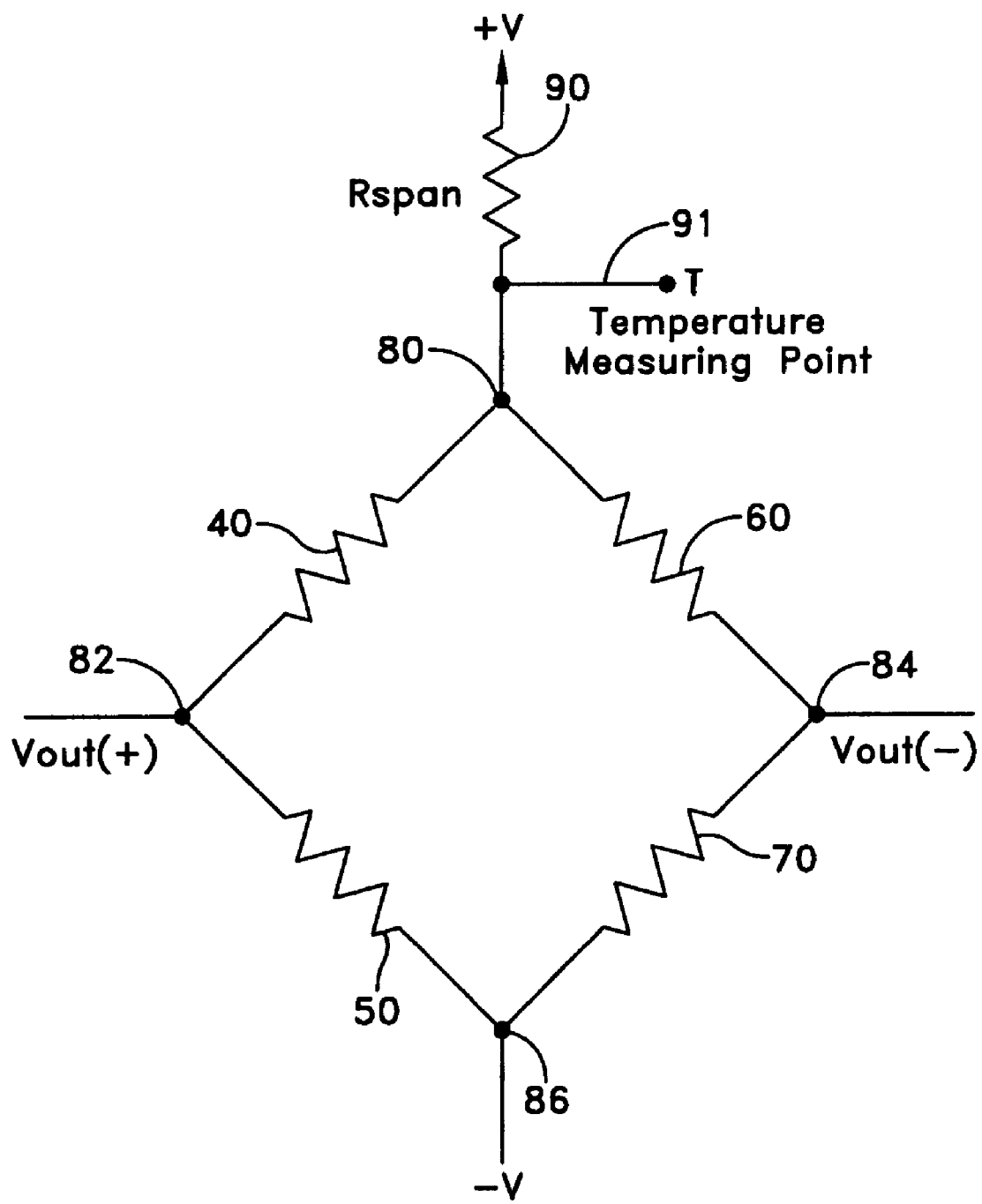
FIG. 6 is a schematic diaphragm of a bridge having a temperature measuring resistor.

Referring to FIG. 6 there is shown the Wheatstone bridge array depicted in FIG. 4. As indicated, the Wheatstone bridge array as depicted in FIG. 4 is only responsive to pressure. In order to measure temperature a span resistor is placed in series with the terminal 80. The resistor 90 is connected in series with the input of the bridge employing resistors 40, 50 and 70 and 80. As the input voltage is applied to the span resistor 90 and the Wheatstone bridge the voltage drop across resistor 90 will vary with temperature because of the change in resistance of the Wheatstone bridge which again will vary with temperature. The bridge resistance varies with temperature because the value of the piezoresistors varies with temperature. In this manner the voltage obtained at terminal 91 is a function of temperature of the wafer 10 as well as the bridge employed on the wafer. This gives an accurate measurement of the temperature at which the silicon wafer is operating and therefore the operating temperature of the entire device.

Figure 7:
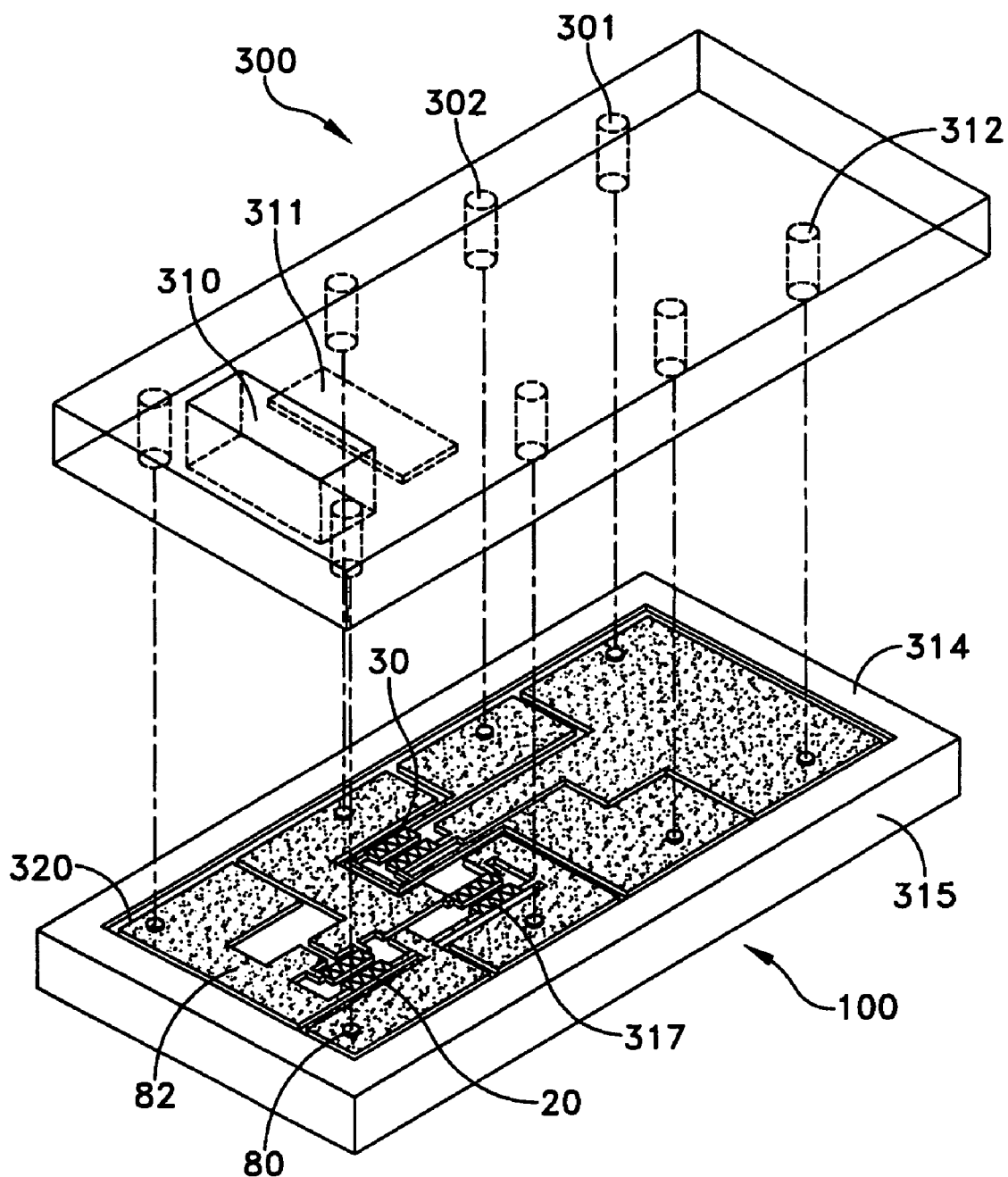
FIG. 7 is a isometric diaphragm of a transducer responsive to pressure vibration and temperature according to this invention.

Referring to FIG. 7 there is shown an isometric view of a transducer assembly according to this invention. As one can see from FIG. 7 there are legends indicated for each of the elements to gain further clarification. Essentially the transducer which is responsive to pressure, vibration and temperature is fabricated utilizing known semiconductor techniques involving micro machining of semiconductor materials in order to obtain predetermined structures. The devices as indicated employ a silicon substrate 315. In order to produce the transducer 100 one uses a silicon substrate 315 which can be processed using pattern and sacrificial wafers as well as via other techniques known in the art. In this manner the deflecting diaphragm 30 is depicted having four piezoresistors 317 which would correspond to piezoresistors 60, 70, 61 and 71 shown in FIG. 1. The metalized contact areas such as 80, 82 depicted in FIG. 1 are shown in FIG. 7. The entire structure is surrounded by an isolation moat 320. The active sensor design 20 which is the sensor subjected to pressure is also depicted and is associated with the silicon sensors of 40 and 50. It is seen in FIG. 7 that sensors 41 and 51 are omitted as they are redundant. However, if desired, they can be included as well. The device has a cover member 300 which may be fabricated from glass or some other insulating material including silicon. The cover 300 is basically isolated from the substrate 315. The cover member contains the through hole 310 which essentially corresponds to through hole 205 as shown in FIG. 3 and FIG. 2. There is a cavity 311 which is positioned above the diaphragm 30 to enable the diaphragm to deflect and respond to acceleration and vibration. The cover member has a plurality of through holes such as 312, 301 and 302, which through holes contain a conductive material which is a glass metal frit and make contact with the metal contact areas as 82 and 80. The sensor according to the present invention is extremely compact, has no protrusions and can be simply utilized, being responsive to pressure, vibration and temperature. The device is extremely reliable and is capable of operating at a high temperature and can be subjected to large pressures and accelerations.

Those of ordinary skill in the art may recognize that many modifications and variations of the present invention may be implemented without departing from the spirit or scope of the invention.

What is claimed is:

1. A transducer responsive to applied pressure and vibration/acceleration comprising:
at least first and second sensor elements connected in series and responsive to an applied pressure and vibration to produce an output signal proportional to applied pressure and vibration/acceleration,
third, fourth, fifth and sixth sensor elements, said third and fourth elements connected in series, said fifth and sixth elements connected in series, said third, fourth, fifth and sixth sensor elements responsive only to said applied vibration/acceleration and non-responsive to said applied pressure,
said first and second sensor elements connected to said third and fourth elements to form a first array for providing an output directly proportional to pressure whereby applied vibration/acceleration is cancelled,
seventh and eighth elements connected in series and connected to said fifth and sixth elements to form a second array for providing an output responsive only to applied vibration/acceleration and non-responsive to applied pressure.

2. The transducer according to claim 1, wherein:
said first to said sixth sensor elements are each piezoresistive elements for providing a change in resistance according to an applied pressure or vibration/acceleration.

3. The transducer according to claim 2 wherein said seventh and eighth elements are fixed resistors.

4. The transducer according to claim 1 wherein said first and second arrays are each a Wheatstone bridge array.

5. The transducer according to claim 2 wherein said piezoresistors are semiconductor piezoresistors formed on a silicon substrate, with first and second piezoresistors positioned on a first deflecting diaphragm region of said substrate, which first deflecting diaphragm region is adapted to receive an applied pressure and an applied vibration/acceleration, with said third to sixth piezoresistive sensors positioned on a second deflecting diaphragm region on said substrate, which said second region is adapted only to receive an applied vibration/acceleration.

6. The transducer according to claim 5 wherein said seventh and eighth resistors are located on an inactive region of said wafer.

7. The transducer according to claim 4 further including:
a span resistor in series with the bias voltage input of said first Wheatstone bridge to provide an output across said span resistor proportional to the temperature of said bridge.

8. The transducer according to claim 7 wherein said first and second Wheatstone bridges are in close proximity to one another.

9. The transducer according to claim 5, further including a cover member coupled to said wafer and having a first aperture communicating with said first deflecting diaphragm region for enabling an applied pressure to deflect said first region, said cover member completely covering said second deflecting diaphragm region to prevent said applied pressure from deflecting said second diaphragm region, with both regions operative to deflect upon application of an applied vibration/acceleration.

10. The transducer according to claim 9 wherein said cover member is fabricated from glass.

11. A transducer responsive to an applied pressure, vibration/acceleration, comprising:
a semiconductor wafer having a first thin active area indicative of a first diaphragm deflecting region surrounded by an inactive wafer area, said wafer having a second thin active area indicative of a second diaphragm deflecting region also surrounded by an inactive wafer area,
first and second piezoresistive elements located on said first region and connected in series,
third, fourth, fifth and sixth piezoresistive elements located on said second region with said third and forth elements connected in series, and with said fifth and sixth elements connected in series,
said first and second elements connected to said third and fourth elements to form a first Wheatstone bridge array,
first and second resistors connected in series and positioned on an inactive area of said wafer, said first and second resistors connected to said fifth and sixth elements to form a second Wheatstone bridge array,
a cover member secured to said wafer and having an aperture communicating with said first deflecting region to apply a pressure to said first and second piezoresistor elements, said cover member completely covering said second deflecting region to prevent said second region from deflecting from said applied pressure, whereby said first and second regions both deflect upon application of an applied vibration/acceleration to cause said first bridge to provide an output voltage directly proportional to pressure only, whereby any vibration/acceleration component is cancelled and to cause said second bridge to provide an output voltage directly proportional to vibration/acceleration.

12. The transducer according to claim 11 further including a span resistor in series with the voltage input of said first bridge to provide an output across said span resistor indicative of the temperature of said wafer.

13. The transducer according to claim 11 wherein said wafer is fabricated from silicon.

14. The transducer according to claim 13 wherein said piezoresistors are formed on said wafer.

15. The transducer according to claim 14 wherein said piezoresistors are dielectrically isolated from said wafer.

16. The transducer according to claim 13 wherein said cover member is fabricated from glass.

17. The transducer according to claim 12 wherein said span resistor has a relatively zero temperature coefficient.

18. The transducer according to claim 11 wherein said first and second deflecting regions are relatively of the same thickness and area dimensions.

19. The transducer according to claim 11 wherein said piezoresistors are relatively of the same value.

20. The transducer according to claim 11 wherein said wafer is mounted on a metal shim.

21. The transducer according to claim 20 wherein said shim is fabricated from Kovar.

\* \* \* \* \*